(12) United States Patent
Pokorzynski et al.

(10) Patent No.: US 6,708,462 B2
(45) Date of Patent: Mar. 23, 2004

(54) FOAM-IN-PLACE SEAL AND METHOD

(75) Inventors: Tony M. Pokorzynski, Holland, MI (US); Mark R. Decker, Zealand, MI (US); Rob E. Springer, West Olive, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 137 days.

(21) Appl. No.: 09/801,369

(22) Filed: Mar. 7, 2001

(65) Prior Publication Data

US 2002/0125734 A1 Sep. 12, 2002

(51) Int. Cl.[7] ............................................. B62D 25/00
(52) U.S. Cl. .................... 52/716.5; 52/309.1; 52/309.4; 52/222; 296/146.7
(58) Field of Search .......................... 52/309.1, 309.4, 52/455, 222, 273, 511, 716.3, 716.5, 782.1; 296/146.7, 89.1

(56) References Cited

U.S. PATENT DOCUMENTS

| | | | | |
|---|---|---|---|---|
| 2,387,317 A | * | 10/1945 | Cunnington | 52/511 |
| 3,505,772 A | * | 4/1970 | Claire et al. | 52/511 |
| 4,779,390 A | * | 10/1988 | Repper et al. | 52/222 |
| 4,980,934 A | * | 1/1991 | Dahowski et al. | 4/496 |
| 5,029,422 A | * | 7/1991 | Scherrer | 52/222 |
| 5,050,351 A | * | 9/1991 | Goldbach et al. | 49/502 |
| 5,090,226 A | | 2/1992 | Takeoka et al. | |
| 5,293,726 A | * | 3/1994 | Schick | 52/455 |
| 5,385,194 A | * | 1/1995 | Brown | 160/354 |
| 5,410,011 A | | 4/1995 | Konishi et al. | |
| 5,478,107 A | | 12/1995 | Yamagishi et al. | |
| 5,478,136 A | | 12/1995 | Takeuchi et al. | |
| 5,500,168 A | | 3/1996 | Suzuki | |
| 5,500,169 A | | 3/1996 | Kondo et al. | |
| 5,512,361 A | | 4/1996 | Takeuchi et al. | |
| 5,527,834 A | | 6/1996 | Fujita et al. | |
| 5,548,057 A | | 8/1996 | Hirayama et al. | |
| 5,573,272 A | | 11/1996 | Teshima | |
| 5,577,794 A | * | 11/1996 | Gandhi et al. | 296/146.6 |
| 5,578,649 A | | 11/1996 | Imai et al. | |
| 5,591,482 A | | 1/1997 | He et al. | |
| 5,618,477 A | | 4/1997 | Suzuki | |
| 5,643,612 A | | 7/1997 | Suzuki | |
| 5,722,336 A | | 3/1998 | Takeuchi | |
| 5,941,590 A | * | 8/1999 | Reynolds et al. | 296/39.1 |
| 6,086,139 A | * | 7/2000 | Heim et al. | 296/146.5 |
| 6,536,832 B1 | * | 3/2003 | Grimm et al. | 296/146.6 |

FOREIGN PATENT DOCUMENTS

| | | | | |
|---|---|---|---|---|
| EP | 0891892 A1 | * | 3/1999 | B60R/13/02 |
| JP | 0249512 | * | 10/1989 | 296/39.1 |
| JP | 406048255 A | * | 2/1994 | 296/146.7 |

* cited by examiner

*Primary Examiner*—Brian E. Glessner
(74) *Attorney, Agent, or Firm*—Price, Heneveld, Cooper, DeWitt & Litton

(57) ABSTRACT

An injection molded skin has an edge which is substantially thicker than the major surface of the skin which is adapted to be fitted within a slot in a skin-receiving substrate, such that it forms a seal when cushioned urethane foam material is injected behind the skin between the skin and substrate. The method of manufacturing the panel includes the steps of providing a substrate having a slot formed therein for receiving a peripheral edge of a skin of material, introducing a peripheral edge of a skin material having a thickness greater than the overall thickness of the skin into the slot, and injection molding a foam polymeric material behind this skin with a pressure which seals the peripheral edge of the skin to the slot for completing the decorative panel so formed.

14 Claims, 1 Drawing Sheet

FOAM-IN-PLACE SEAL AND METHOD

BACKGROUND OF THE INVENTION

The present invention relates to vehicle interior components and particularly to a seal design for manufacturing a foam-backed panel.

Padded or cushioned vehicle interior components or panels, such as the instrument panel, door panels and the like, have been made by providing a powdered PVC (polyvinyl chloride) slush-molded skin which is held in place over a substrate and back-filled with a urethane foam material in an injection process in which the edges of the skin is sealed using a plurality of clamps for providing a finished product in which the skin, with the padded foam backing, is bonded to an original substrate, such as the edges of a door panel, the edges of an instrument panel, or the like. Although such a process results in a suitable product, the cost of manufacturing molds with the multiple seals for the edges of the skin to prevent the escape of the backing foam material is prohibitive. As a result, the process typically has only been used in luxury vehicles where the additional expense can be supported.

Thus, although the manufacture of relatively expensive, decorative cushioned panels has been accomplished utilizing such tooling, there exists a need for providing an inexpensive, cost effective system whereby cushioned (soft-feel) panels can be employed for vehicles.

SUMMARY OF THE INVENTION

The system of the present invention accomplishes this goal by providing an injection molded skin made of an injection molded polymeric material having an edge which is substantially thicker than the major surface of the skin and which edge is shaped to be fitted within a recess in the skin-receiving substrate, such that it forms a seal when cushioned urethane foam material is injected behind the skin between the skin and substrate.

In a preferred embodiment of the invention, the periphery of the skin, which is attached to the substrate, has a thickness of from three to six times that of the primary thickness of the skin and, in the most preferred embodiment of the invention, the peripheral edge is tapered to allow its easy insertion into a slot of a substrate for receiving the edge of the skin. The utilization of a relatively thick peripheral edge of the skin, therefore, allows it to be held within a recess of the substrate and self-seal without the need for specific clamping seals during the molding process, which greatly reduces the cost of manufacture while providing the same desired cushioned panel for vehicle interior components. The method of manufacturing the panel of the present invention includes the steps of providing a substrate having a slot formed therein for receiving a peripheral edge of a skin of material, introducing a peripheral edge of a skin material having a thickness greater than the overall thickness of the skin into the slot, and injection molding a foam polymeric material behind this skin with a pressure which seals the peripheral edge of the skin to the slot for completing the decorative panel so formed.

These and other features, objects and advantages of the present invention will become apparent upon reading the following description thereof together with reference to the accompanying drawings.

DETAILED DESCRIPTION OF THE PREFERRED EMBODIMENT

Figure 1:
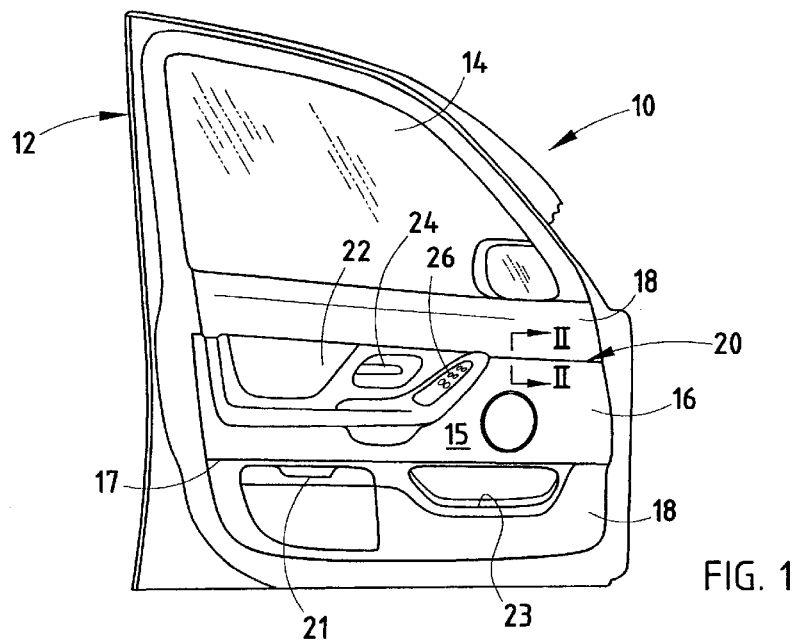
FIG. 1 is a fragmentary front elevational view of a vehicle door panel embodying the present invention.

Referring initially to FIG. 1, there is shown a vehicle 10, such as an automobile, and particularly a passenger side door 12 thereon. Door 12 is mounted to the vehicle body in a conventional manner and includes a window 14 above a rigid panel 18 with a decorative cushioned panel 16 joined to panel 18 along a seam 20 according to the structure and method of the present invention. Panel 18 forms a substrate behind cushioned panel 16 and may include an armrest 22 mounted thereon, a door actuating handle 24, and a switch pad 26 for actuating, for example, electrically operated windows, door locks, and the like. In the past, the cushioned panel 16 was made of a relatively thin material which was slush-molded powdered PVC having a uniform thickness and which defined a skin with edges which were tucked into recesses formed in panel 18, such as at seam 20. The edges were held therein during the back-molding of the skin with a cushioning foam, such as a closed-cell urethane foam by employing a plurality of spaced clamps in a mold-in-place tool, such that the entire door panel including upper panels 18 and panel 16 can be integrally formed with a clean intersecting line 20 between the two different materials. Panel 18 is typically made of a suitable polymeric material, such as polypropylene having a textured or decorative hard outer surface conforming to the interior trim of the vehicle. Frequently, upper panel 18 and center panel 16 will be of complimentary but different colors to add to the design appearance of the vehicle's interior. Panel 16 can extend to any desired position of the door.

Figure 2:
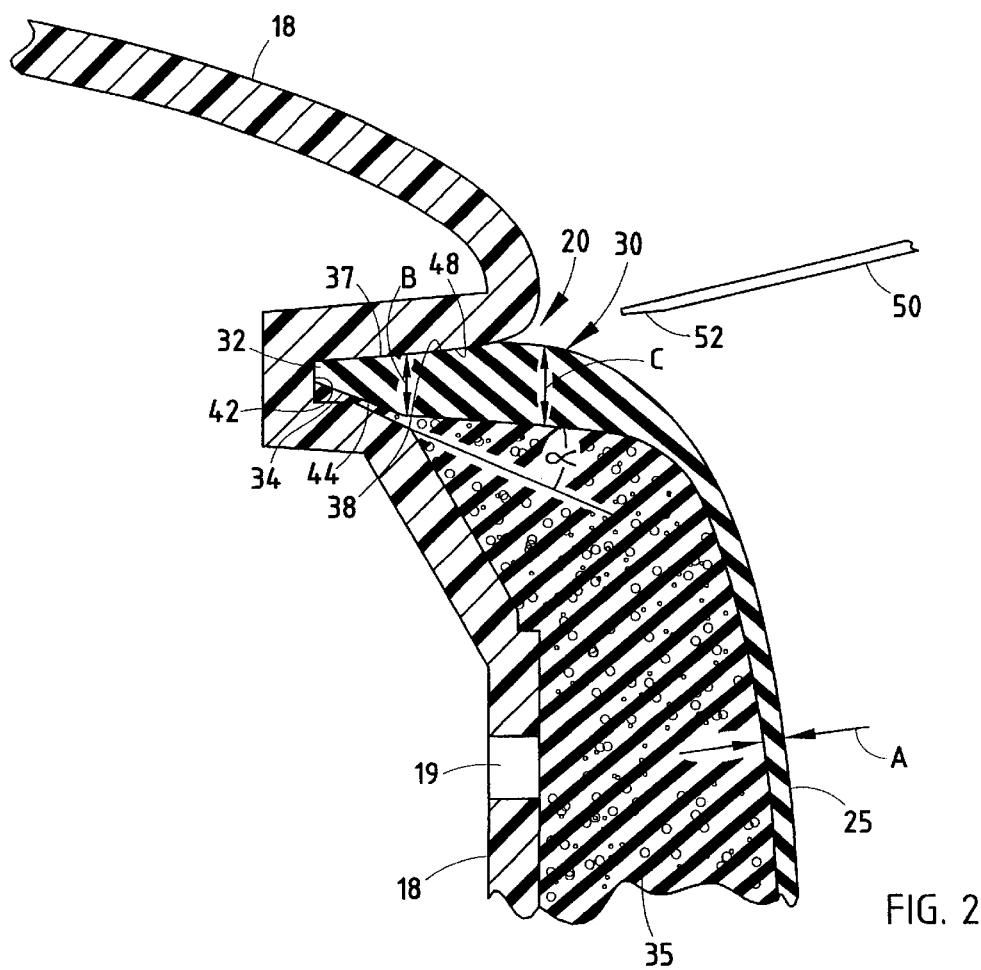
FIG. 2 is a greatly enlarged cross-sectional view of the door panel shown in FIG. 1, taken along section lines II—II of FIG. 1.

According to the present invention as seen in FIG. 2, panel 16 is an injection molded skin 25 (FIG. 2) made of reaction injection molded urethane material or injection molded PVC (polyvinyl chloride) or TPO (thermoplastic olefin) which has a surface 15 (FIG. 1) which may encompass selected exposed areas of panel 16. Panel 16 also includes a peripheral edge 30, which has a thickness significantly greater than the average thickness of the major surface of the skin, which is typically approximately 1 mm, as shown by dimension A in FIG. 2. Edge 30, on the other hand, has a thickness of from at least three to six times greater and, in one embodiment, had a thickness at dimension B of approximately 3 mm. Edge 30 terminates at an end 32 with a corner 34 beveled at angle α of approximately 20° in the preferred embodiment to allow its easy insertion into a slot 42 integrally formed in the lower panel 18 at seam 20. Panel 18 typically will cover the entire inner surface the door or other vehicle component with part of the panel being exposed (at 18 in FIG. 1, for example) and the remainder forming a substrate for a cushioned outer skin 25 and other components mounted to the door such as storage compartments 21 and 23 shown in FIG. 1. Slot 42 includes a tapered wall 44 with a slight gap for easily receiving the tapered corner 34 of skin 25. The depth of slot 42 is sufficient to receive the tapered end 32 of skin 30 which has a slightly increasing thickness to approximately 4 mm at its dimension C such that the end 32 of skin 25 is significantly thicker than the overall major surface area of panel 16 at the periphery of its intersection with panel 18. A similar interconnection exists for the remaining periphery of panel-forming skin 25 at, for example, seam 17 of door 12.

Once the skin 25 is molded into a shape for a particular vehicle component, its thicker peripheral edges are tucked into the peripheral slot 42 in the substrate panel 18 by a tool member 50 shown schematically in FIG. 2. The space between skin 25 and substrate 18 is injection-molded through apertures 19 in panel 18 with a closed-cell urethane foam 35 in a conventional injection-molding mold and process to fill the space between skin 25 and substrate 18 to provide the padded or cushioned "feel" for the panel defined by skin 25. The urethane material may have a thickness of from about 3 to about 15 mm, and preferably from about 6 to about 8 mm, which thickness can vary for a given desired padding effect for a given component. By providing an enlarged, thicker end 30 around the periphery of panel forming skin 25, the peripheral edge can be tucked into the slot of panel 18 without the need for sealing clamps spaced around the periphery during the injection molding process inasmuch as the urethane foam 35 injected behind the skin 25 self-seals the end 32 in slot 42 of panel 18, providing clean and neat appearing interfaces 17 and 20 at the junction of skin 25 and panel 18.

Tooling for the system shown in FIGS. 1 and 2 is relatively inexpensive as compared to the complicated, multi-clamp tooling required for prior art systems and, for example, tool 50 (shown schematically in FIG. 2) may be in the form of a tray which holds the injection-molded skin 25 and raises the skin vertically into position against the panel 18, tucking the thickened ends 32 into slots 42 without the need for holding clamps. Tool 50 may be in the form of a tray with a peripheral edge 52 for supporting the peripheral edge 30 of skin 25 as it is pushed into place in peripheral slot 42 of substrate 18 and thereafter urethane foam is injection molded through apertures 19 in substrate 18 to complete the integrated soft-skin panel of, for example, door 12.

The back pressure provided by the closed-cell urethane foam material injected into space 35 provides a seal at the interface 37 between surface 38 (FIG. 2) of skin 25 and inner surface 48 of panel 18 to prevent foam from leaking from seams 17 and 20. The system of the present invention, therefore, provides an improved skin design for forming a decorative panel for a vehicle as well as a method of manufacturing a panel by tucking the skin into a receiving slot and injection molding a cushioning material behind the skin which self-seals during the injection molding process. Thus, with the method and apparatus of the present invention, a trim panel for a vehicle can be inexpensively manufactured and maintain the desired appearance of similar panels made utilizing a much more expensive process. It will become apparent to those skilled in the art that various modifications to the preferred embodiment of the invention as described herein can be made without departing from the spirit or scope of the invention as defined by the appended claims.

The invention claimed is:

1. A vehicle interior component comprising:

a resilient skin, the majority of the skin having a first thickness, and an edge of the skin having a second thickness greater than the first thickness;

a substrate having a slot, the edge of the skin fitted within the slot of the substrate; and a foam polymeric material disposed between the substrate and the skin, the foam polymeric material sealing the edge of the skin to the slot in the substrate.

2. The component of claim 1 wherein said second thickness is from about three to about six times greater than said first thickness.

3. The component of claim 2 wherein said edge of said skin includes a tapered end to facilitate insertion into the slot.

4. The component of claim 1 wherein said slot includes a tapered edge for receiving said tapered end of said skin.

5. The component of claim 4 wherein said substrate is comprised of a polypropylene material.

6. The component of claim 1 wherein said skin is comprised of urethane.

7. The component of claim 1 wherein said skin is comprised of PVC.

8. The component of claim 1 wherein said skin is comprised of TPO.

9. A vehicle interior component comprising:

a substrate having a slot;

a resilient skin, the majority of the skin having a first thickness of about 1 mm and an edge having a thickness of from about 3 mm to about 6 mm, the edge of the skin including a tapered end, the edge of the skin fitted within the slot of the substrate; and a foam polymeric material disposed between the substrate and the skin, the foam polymeric material sealing the edge of the skin to the slot in the substrate.

10. The component of claim 9 wherein said skin is comprised of urethane.

11. The component of claim 9 wherein said skin is comprised of PVC.

12. The component of claim 9 wherein said skin is comprised of TPO.

13. The component of claim 9 wherein said slot includes a tapered edge for receiving the tapered end of said skin.

14. The component of claim 13 wherein said substrate is comprised of a polypropylene material.

* * * * *